(12) United States Patent
He et al.

(10) Patent No.: US 12,148,314 B2
(45) Date of Patent: Nov. 19, 2024

(54) SYSTEM AND METHOD FOR DYNAMICALLY AUGMENTING RASTER CHARTS DISPLAYED ON A COCKPIT DISPLAY (71) Applicant: HONEYWELL INTERNATIONAL INC., Charlotte, NC (US)

(72) Inventors: Gang He, Morristown, NJ (US); Thea Feyereisen, Hudson, WI (US); Pavan Kumar Desai, Bengaluru (IN); Atmacharan Ajjavara, Bangalore (IN); Rakshit R, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 956 days.

(21) Appl. No.: 17/143,729

(22) Filed: Jan. 7, 2021

(65) Prior Publication Data
US 2022/0215767 A1 Jul. 7, 2022

(51) Int. Cl.
*G08G 5/00* (2006.01)
*B64D 43/00* (2006.01)
*G06F 16/29* (2019.01)

(52) U.S. Cl.
CPC .......... *G08G 5/0047* (2013.01); *B64D 43/00* (2013.01); *G06F 16/29* (2019.01); *G08G 5/0004* (2013.01); *G08G 5/003* (2013.01)

(58) Field of Classification Search
None
See application file for complete search history.

(56) References Cited

U.S. PATENT DOCUMENTS

| | | | |
|---|---|---|---|
| 4,827,419 A | 5/1989 | Selby, III | |
| 5,978,715 A | 11/1999 | Briffe et al. | |
| 8,200,416 B2 | 6/2012 | Aspen | |
| 8,200,433 B1 | 6/2012 | Siniff et al. | |
| 8,843,255 B2 * | 9/2014 | Wilson | G01C 23/005 701/16 |

(Continued)

FOREIGN PATENT DOCUMENTS

| | | |
|---|---|---|
| GB | 2416884 A | 2/2006 |
| WO | 2009002603 A1 | 12/2008 |

*Primary Examiner* — Aniss Chad
*Assistant Examiner* — Mahmoud M Kazimi
(74) *Attorney, Agent, or Firm* — Lorenz & Kopf LLP (57) ABSTRACT

A controller for selectively displaying information from raster charts is disclosed. The controller is configured to: retrieve raster data; assign a different priority level to each of a plurality of types of raster data; cause raster data having a predetermined priority level to be displayed with first augmentation information and prevent from being displayed raster data not having the first predetermined priority level, wherein the first augmentation information comprises database data retrieved from a database and is assigned a first predetermined augmentation information priority level; generate a hidden layer of second augmentation information comprising database data from the database that is correlated to a geographical location of the displayed raster data and assigned a second predetermined augmentation information priority level; and cause the hidden layer of second augmentation information to be displayed over a portion of the displayed raster data when the geographical location is selected.

20 Claims, 5 Drawing Sheets

(56) References Cited

U.S. PATENT DOCUMENTS

| | | | |
|---|---|---|---|
| 8,878,872 B1* | 11/2014 | Raghu | G01C 23/005 |
| | | | 345/660 |
| 9,041,560 B2* | 5/2015 | Venkataswamy | G08G 5/025 |
| | | | 701/457 |
| 9,146,133 B2 | 9/2015 | Pepitone et al. | |
| 9,404,767 B2 | 8/2016 | McNeil Brown | |
| 9,410,819 B2 | 8/2016 | Williams | |
| 9,852,493 B2* | 12/2017 | Wilson, Jr. | G01C 21/20 |
| 2006/0031006 A1* | 2/2006 | Stenbock | G01C 21/3881 |
| | | | 701/492 |
| 2010/0333040 A1 | 12/2010 | Palanisamy et al. | |
| 2013/0027226 A1 | 1/2013 | Cabos | |
| 2015/0149081 A1 | 5/2015 | Kramer | |
| 2015/0239574 A1 | 8/2015 | Ball et al. | |
| 2016/0260253 A1* | 9/2016 | Reddy | G06T 15/205 |
| 2017/0138759 A1 | 5/2017 | Turner et al. | |
| 2020/0184830 A1 | 6/2020 | Samuthirapandian et al. | |

* cited by examiner

SYSTEM AND METHOD FOR DYNAMICALLY AUGMENTING RASTER CHARTS DISPLAYED ON A COCKPIT DISPLAY

CROSS REFERENCE TO RELATED APPLICATION

This application claims priority to Indian Provisional Patent Application No. 202011049239, filed Nov. 11, 2020, the entire content of which is incorporated by reference herein.

TECHNICAL FIELD

Embodiments of the subject matter described herein relate generally to flight deck display systems. More particularly, embodiments of the subject matter relate to flight deck display systems for displaying raster charts.

BACKGROUND

Raster charts, such as sectional, Hi/Lo IFR charts published by the FAA, can be very useful for pilots. A raster chart is an electronic picture of a paper chart obtained typically through an accurate, detailed scanning of the paper chart. Raster charts, typically, have exactly the same information as the paper chart. When raster charts are used within an integrated Navigation display environment, a typical approach is to position the raster data underneath the navigational data. The raster data forms an image and many existing Navigational display elements overlap with raster image elements. The overlapping elements may have different features, such as different colors, shapes, and/or dimensions. These differences and the overlap can lead to significant display clutter and increased flight crew workload to declutter and deconflict navigational data associated with chart image data.

Hence, it is desirable to provide a raster data display without significant display clutter. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight deck system in an aircraft for selectively displaying information from raster charts on a display device is disclosed. The flight deck system includes a controller configured to: retrieve raster data from a pre-stored raster chart; assign a different priority level from a plurality of priority levels to each of a plurality of types of raster data from the raster chart; cause raster data having a first predetermined raster data priority level from the plurality of priority levels to be displayed with first augmentation information for a geographic region of interest on the display device in the aircraft and prevent from being displayed raster data not having the first predetermined priority level, wherein the first augmentation information includes database data retrieved from a database stored on the aircraft and assigned a first predetermined augmentation information priority level; generate a hidden layer of second augmentation information including database data retrieved from the database that is correlated to a geographical location of the displayed raster data and assigned a second predetermined augmentation information priority level; and cause the hidden layer of second augmentation information to be displayed as an overlay over a portion of the displayed raster data when the geographical location is selected.

A processor implemented method in an aircraft for selectively displaying information from raster charts on a display device is disclosed. The method includes: retrieving raster data from a pre-stored raster chart; assigning a different priority level from a plurality of priority levels to each of a plurality of types of raster data from the raster chart; displaying raster data having a first predetermined raster data priority level from the plurality of priority levels with first augmentation information for a geographic region of interest on the display device in the aircraft and not displaying raster data not having the first predetermined priority level, wherein the first augmentation information includes database data retrieved from a database stored on the aircraft and assigned a first predetermined augmentation information priority level; generating a hidden layer of second augmentation information including database data retrieved from the database that is correlated to a geographical location of the displayed raster data and assigned a second predetermined augmentation information priority level; and displaying the hidden layer of second augmentation information as an overlay over a portion of the displayed raster data when the geographical location is selected.

Non-transitory computer readable media encoded with programming instructions configurable to cause a processor in flight deck equipment in an aircraft to perform a method is disclosed. The method includes: retrieving raster data from a pre-stored raster chart; assigning a different priority level from a plurality of priority levels to each of a plurality of types of raster data from the raster chart; displaying raster data having a predetermined priority level from the plurality of priority levels for a geographic region of interest on the display device in the aircraft and not displaying raster data not having the first predetermined priority level, wherein the first augmentation information includes database data retrieved from a database stored on the aircraft and assigned a first predetermined augmentation information priority level; generating a hidden layer of second augmentation information including database data retrieved from the database that is correlated to a geographical location of the displayed raster data and assigned a second predetermined augmentation information priority level; and displaying the hidden layer of second augmentation information as an overlay over a portion of the displayed raster data when the geographical location is selected.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for providing a dynamically augmented raster data display on a cockpit display. The apparatus, systems, techniques, and articles provided herein can allow a raster data display priority to be dynamically adjusted, and/or localized areas on a raster map to be dynamically associated with geographically collocated Nav/culture/structural information.

The apparatus, systems, techniques, and articles provided herein can allow user triggering or automatic triggering of dynamic information augmentation for raster data areas of interests. Dynamic information augmentation for raster data areas of interests can provide flight crews with additional information for operation planning or other purposes.

Figure 1:
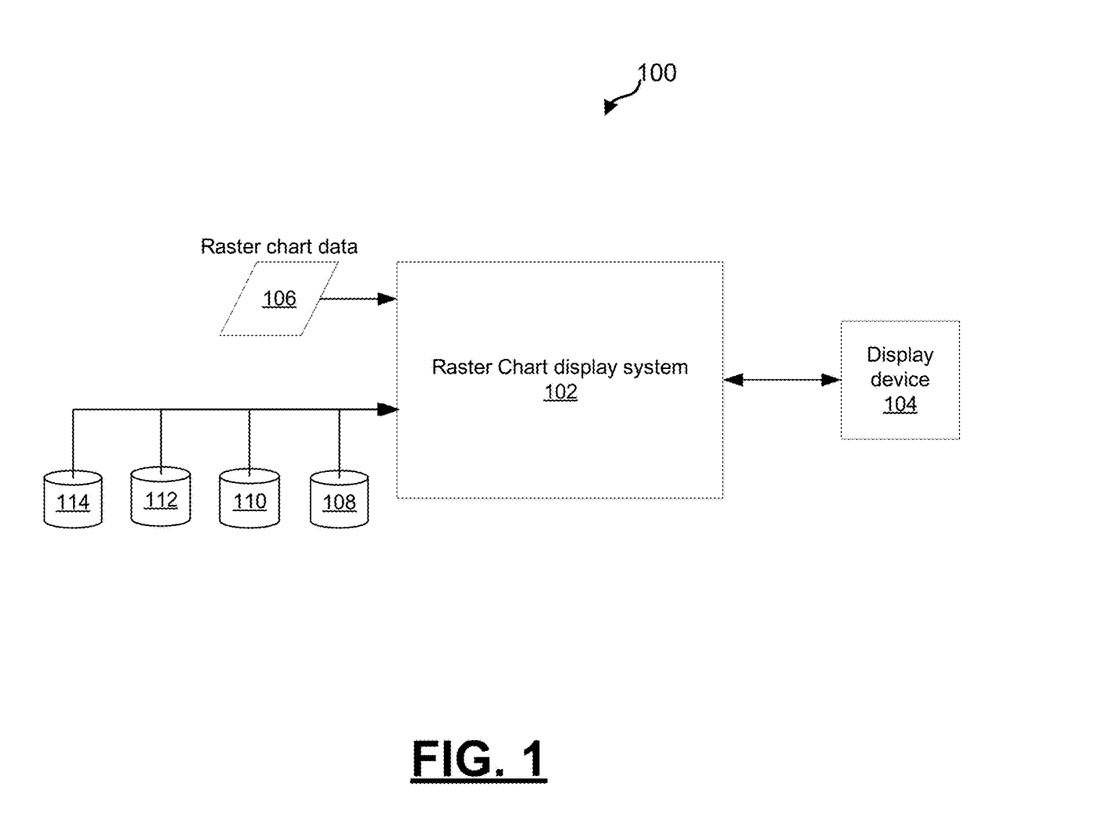
FIG. 1 is a block diagram depicting an example aircraft environment for implementing a raster chart display system for causing raster chart data from a raster chart to be displayed on a cockpit display device, in accordance with some embodiments.

FIG. 1 is a block diagram depicting an example aircraft environment 100 for implementing a raster chart display system 102 for causing raster chart data 106 from a raster chart to be displayed on a cockpit display device 104 (e.g., a head down display (HDD), a head up display (HUD), a primary flight display (PFD), a multifunction display (MFD), a navigation display, an electronic flight bag (EFB), a tablet computer, or other types of display devices used in an aircraft cockpit). A raster chart is an electronic picture of a paper chart obtained typically through an accurate, detailed scanning of the paper chart.

The raster chart display system 102 is implemented by flight deck equipment in an aircraft. The flight deck equipment may be dedicated hardware in the aircraft for implementing the raster chart display system 102 or may be flight deck equipment that implements other flight deck functions. The raster chart display system includes a controller that includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The raster chart display system 102 is configured to generate a dynamically augmented raster data display for use on the cockpit display device 104. The dynamically augmented raster data display, in normal operation, displays some, but not all, the raster data 106 from the paper chart from which the raster data display was derived. The dynamically augmented raster data display is augmented, by the raster chart display system 102, to display various portions of the non-displayed data from one or more geo-referenced data sources upon certain conditions occurring. The geo-referenced data sources may include one or more of an EGPWS (enhanced ground proximity warning system) terrain database 108, an airports database 110, a navigation aids (NAVAID) database 112, an airspace database 114, flight plan data, weather data, traffic data, or some other source.

The certain conditions may occur upon one or more of: a cursor touch action or hovering over a geographical region of the dynamically augmented raster data display, selection of a geographical region of the dynamically augmented raster data display (e.g., via click action using a cursor), automatically upon an aircraft reaching a geographical area, and/or the aircraft reaching a geographical area coupled with a cursor hovering action or touch action on a touchscreen over the geographical region or selection of the geographical region of the dynamically augmented raster data display. Upon the certain conditions occurring, the raster chart display system 102 causes certain portions of the previously non-displayed data related to the objects in the paper chart from which the raster data display was derived and/or data from other sources to be displayed as an overlay over the dynamically augmented raster data display.

This allows the raster chart display system 102 to provide flight crew on a cockpit display in an aircraft with essential information from a paper chart without cluttering the display with nonessential information, and on demand or automatically augment the display with additional, geographically relevant information via an overlay. The data included in the overlay are limited to geographically relevant data. The geographically relevant data includes data that are related to an automatically selected geographical region (e.g., upon the aircraft reaching a predetermined geographical location) and/or data that are related to a manually selected geographical region (e.g., via cursor hovering or cursor selection).

The raster chart display system 102 can accomplish the generation of a dynamically augmented raster data display by assigning priority levels to different types of raster data 106 from a raster chart and only causing the augmented raster data having a predetermined priority level(s) to be displayed until certain conditions occur. When those certain conditions occur, the raster chart display system 102 is configured to cause augmented raster data with a different priority level(s) that are geographical relevant to be displayed as an overlay over the prior display.

The raster chart display system 102 is also configured to geographically correlate different types of database data (e.g., data from databases 108, 110, 112, 114) to the raster data 106 and make the correlated database data available to the display device 104 in one or more hidden layers that are hidden from display. The raster chart display system 102 is also configured to assign priority levels to the different types of database data and when certain conditions occur cause database data having predetermined priority levels that are geographical relevant to be displayed as an overlay.

The raster chart display system 102 is also configured to geographically correlate different types of dynamically generated information related to a flight path or plan for the aircraft to the raster data 106 and make the correlated dynamically generated information related to a flight path or plan available to the display device 104 in one or more hidden layers that are hidden from display. The raster chart display system 102 is also configured to assign priority levels to the different types of dynamically generated information and when certain conditions occur cause different types of dynamically generated information having predetermined priority levels that are geographical relevant to be displayed as an overlay. The different types of dynamically generated information may include flight plan data, weather data, and traffic data and others.

The raster chart display system 102 may allow a user to select the type of raster data 106, database data, and dynamically generated information to be displayed in a normal raster data display (e.g., before dynamic augmentation is applied) by allowing a user to select the data priority levels for the data to be displayed in the normal raster data display. The raster chart display system 102 may also allow a user to select the type of raster data 106, database data, and/or dynamically generated information to displayed in a dynamically augmented display when certain conditions occur by allowing a user to select the data priority levels for the data to be displayed when the certain conditions occur.

Figure 2A:
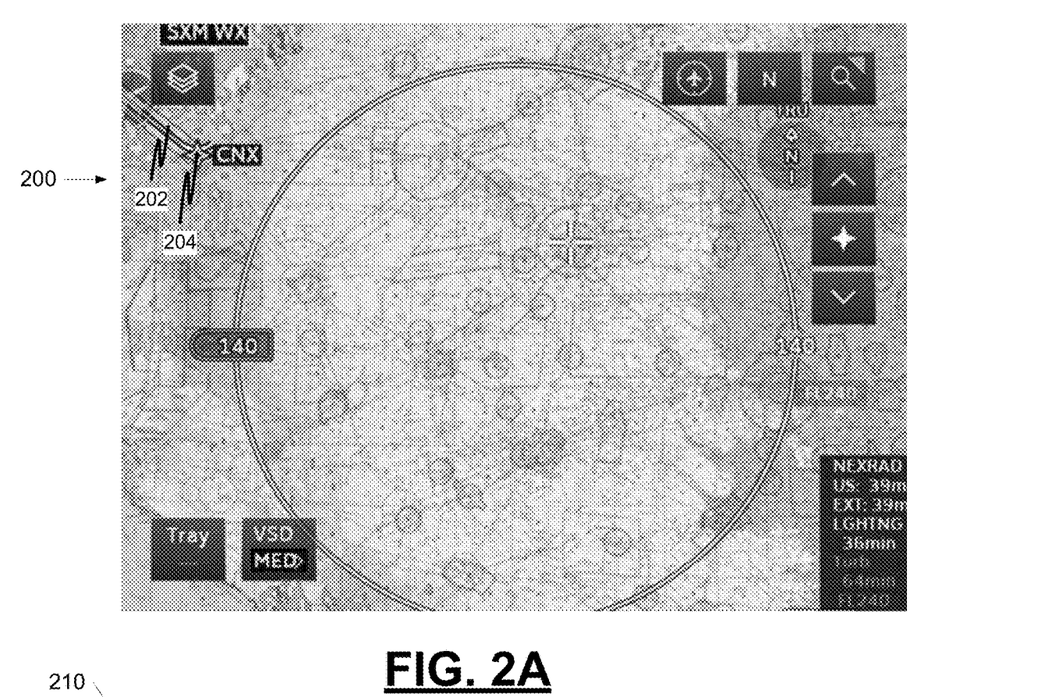
FIGS. 2A and 2B are diagrams depicting example augmented raster charts that may be generated by an example raster chart display system, in accordance with some embodiments.
Figure 2B:
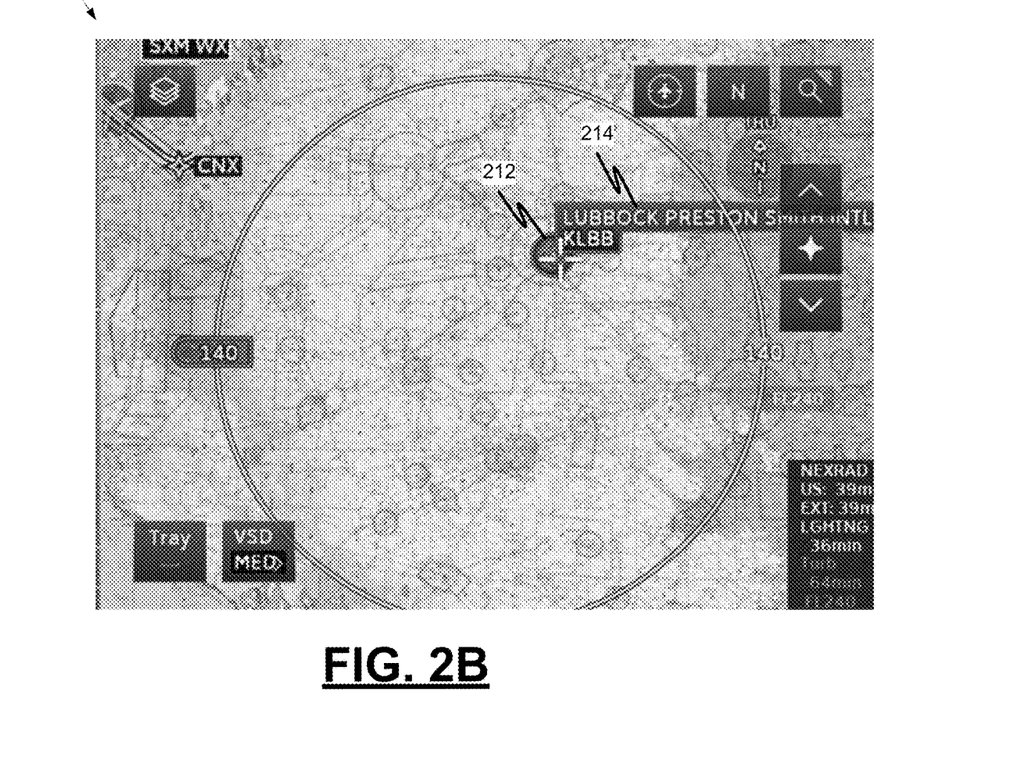

FIGS. 2A and 2B are diagrams depicting example augmented raster charts that may be generated by the raster chart display system 102. FIG. 2A is an example sectional chart depicting an example augmented raster data display 200 that depicts some, but not all, the aeronautical information from an example IFR enroute low altitude chart for navigation under instrument flight rules. An IFR chart may include, in addition to topography information, information regarding: air traffic services, airports that have an instrument approach procedure or a minimum 3000' hard surface runway, airways/route data, cruising altitudes, fixes/ATC reporting points, limits of controlled airspace, military training routes, off route obstruction clearance altitudes (OROCA), radio aids to navigation, RNAV routes, special use airspace areas, tabulations (MTRs, SUAs, MOAs, airport data), and other relevant information. The various types of information are assigned to different priority levels. The assignment to the different priority levels may be configurable by a user or predetermined. The example raster data display 200 has been augmented to include geographically relevant flight plan information including a flight path 202 and waypoint 204.

FIG. 2B is a chart depicting another example augmented raster data display 210. The example augmented raster data display 210 depicts the aeronautical information and flight plan information from the example raster data display 200, plus additional information for dynamically augmenting the raster data display 210. In this example, a geographical region 212 on the augmented raster data display 210 was selected (e.g., by hovering the cursor over the region or direct selection using the cursor). Responsive to the selection, the raster chart display system 102 caused additional aeronautical information 214 to be displayed in an overlay on the augmented raster data display 210. In this example, the selected geographical region 212 is around the location of an airport and the additional aeronautical information 214 includes the name of the airport at the selected geographical region 212. This can allow a user (e.g., flight crew member) to extract additional information related to the airport and view data with much better resolution and/or much better visualization.

Figure 3A:
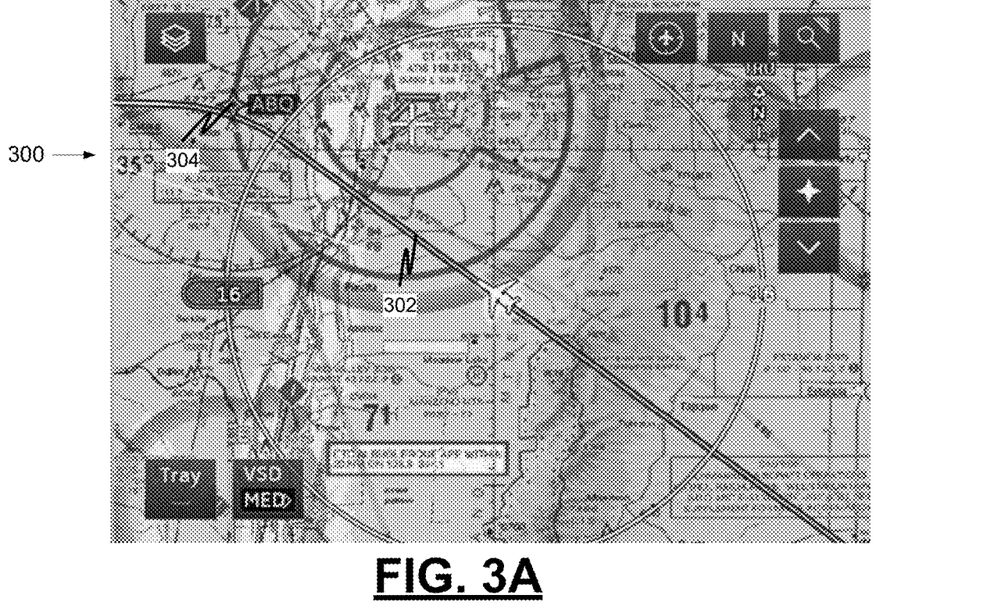
FIGS. 3A and 3B are diagrams depicting example augmented raster charts that may be generated by an example raster chart display system, in accordance with some embodiments.
Figure 3B:
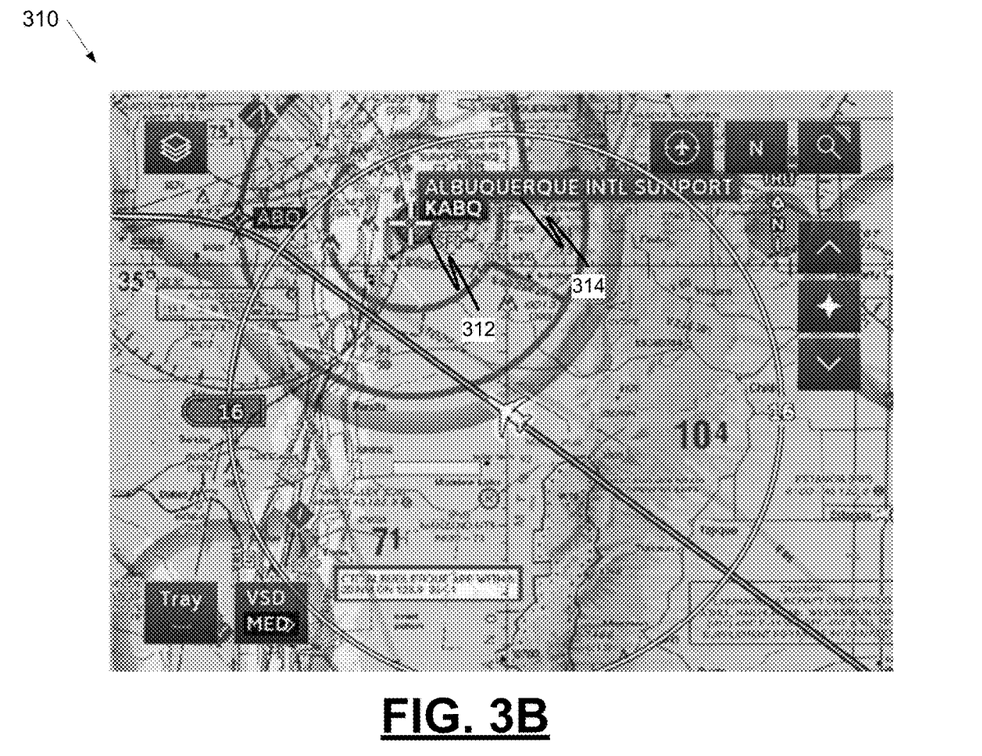

FIGS. 3A and 3B are diagrams depicting example augmented raster charts that may be generated by the raster chart display system 102. FIG. 3A is a chart depicting an example raster data display 300 that depicts some of the interactively augmented aeronautical information from an example FAA published paper chart. The example raster data display 300 has been augmented to include geographically relevant flight plan information including a flight path 302 and waypoint 304 and geographically relevant range, location, and identifiers information.

FIG. 3B is a chart depicting another example augmented raster data display 310. The example augmented raster data display 310 depicts the aeronautical information and flight plan information from the example raster data display 300, plus additional information for dynamically augmenting the raster data display 310. In this example, a geographical region 312 on the augmented raster data display 310 was selected (e.g., by hovering the cursor over the region or direct selection using the cursor). Responsive to the selection, the raster chart display system 102 caused additional aeronautical information 314 to be displayed in an overlay on the augmented raster data display 310. In this example, the selected geographical region 312 is around the location of an airport and the additional aeronautical information 314 includes the name of the airport at the selected geographical region 312. This can allow a user (e.g., flight crew member) to extract additional information related to the airport and view data with much better resolution and/or much better visualization.

Figure 4A:
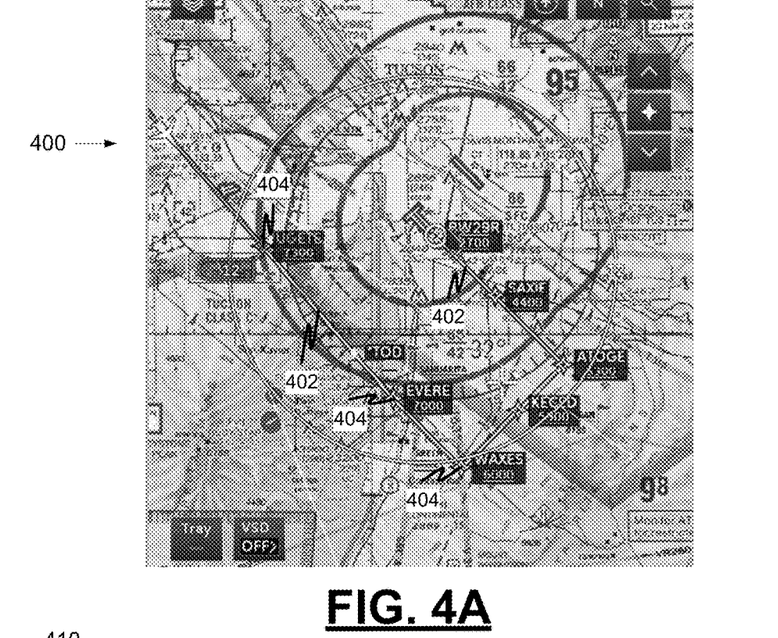
FIGS. 4A and 4B are diagrams depicting example augmented raster charts that may be generated by an example raster chart display system, in accordance with some embodiments.
Figure 4B:
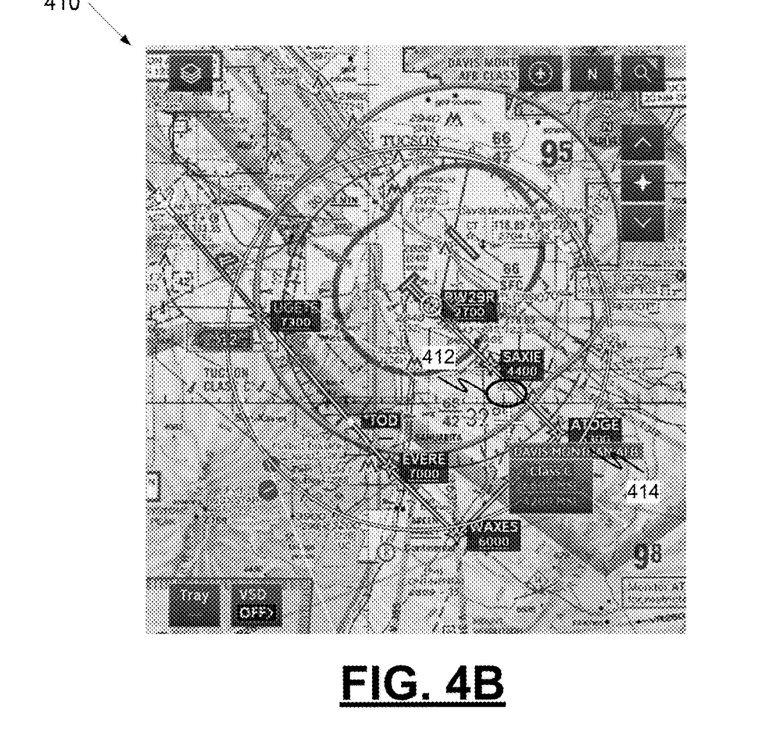

FIGS. 4A and 4B are diagrams depicting example raster charts that may be generated by the raster chart display system 102. FIG. 4A is a chart depicting an example raster data display 400 that depicts some, but not all, the aeronautical information from an example airspace paper chart. The example raster data display 400 has been augmented to include geographically relevant flight plan information including a flight path 402 and waypoints 404 and geographically relevant information.

FIG. 4B is a chart depicting another example augmented raster data display 410. The example augmented raster data display 410 depicts the aeronautical information and flight plan information from the example raster data display 400, plus additional information for dynamically augmenting the raster data display 410. In this example, a geographical region 412 on the augmented raster data display 410 was selected (e.g., by hovering the cursor over the region or direct selection using the cursor). Responsive to the selection, the raster chart display system 102 caused additional aeronautical information 414 to be displayed in an overlay on the augmented raster data display 410. In this example, the selected geographical region 412 is the location of an airport and the additional aeronautical information 414 includes the name of the airport at the selected geographical region 412, the type of the airspace (class C in this example), and airspace dimensions. This can allow a user (e.g., flight crew member) to extract additional information related to the airport and airspace and view data with much better resolution and/or much better visualization.

In these examples, the controller in the raster chart display system 102 may be configured to determine the overall priorities of various display elements for the display device 104 as configurable settings and/or to be dynamically set. In some implementations, the display of flight plan information may be highly desirable and made visible fulltime. In such implementations, flight plan information may always be displayed on top of a raster display. Other elements such as airport, NAVAID, and airways information may generally not be made visible over the raster data but can be dynamically placed over the raster data in an overlay, for example, at certain ranges or on demand. For instance, if an aircraft begins to enter a restricted airspace, information regarding the restricted airspace may be dynamically displayed over the raster area to immediately alert the flight crew. In some implementations, most of the navigational data, airspace, culture, and structural layers information may not be shown over the raster layer.

In one example, the controller that implements the example raster chart display system 102 is configured to: retrieve raster data 106 from a pre-stored raster chart; assign a different priority level from a plurality of priority levels to each of a plurality of types of raster data from the raster chart; cause raster data having a predetermined priority level from the plurality of priority levels to be displayed for a geographic region of interest on the display device in the aircraft during flight and prevent from being displayed raster data not having the predetermined priority level; retrieve database data relating to a flight path of the aircraft from one or more databases; geographically correlate the retrieved database data to the displayed raster data and make the correlated database data available to the display device in one or more hidden layers that are hidden from display; cause a hidden layer of database data that is correlated to a geographical location of the displayed raster data to be displayed as an overlay over a portion of the displayed raster data when the geographical location is selected; cause one or more of flight plan data, weather data, and traffic data to be displayed over the displayed raster data; and cause previously non-displayed raster data having a second priority level that is correlated to a geographical location of the displayed raster data to be displayed as an overlay over a portion of the displayed raster data when the geographical location is selected.

The raster data may comprise topography image data, aeronautical data, railroad data, visual reference points, city boundaries, and/or road data. The database data may comprise one or more of terrain data from an EGPWS terrain database 108, airport data from an airports database 110, navigation aid data from a navigation aids database 112, airspace data from an airspace database 114, communication frequency data, NOTAM data, or other data from another type of database.

The geographical location of the displayed raster data may be selected via touch action on a touchscreen or hovering a cursor over the geographical location on the display device. The geographical location of the displayed raster data may be selected via a cursor click action or touch action at the geographical location on the display device. The geographical location of the displayed raster data may be automatically selected when the aircraft reaches a certain geographically area on its flight path. The geographical location of the displayed raster data may only be selectable when the aircraft reaches a certain geographically area on its flight path.

Figure 5:
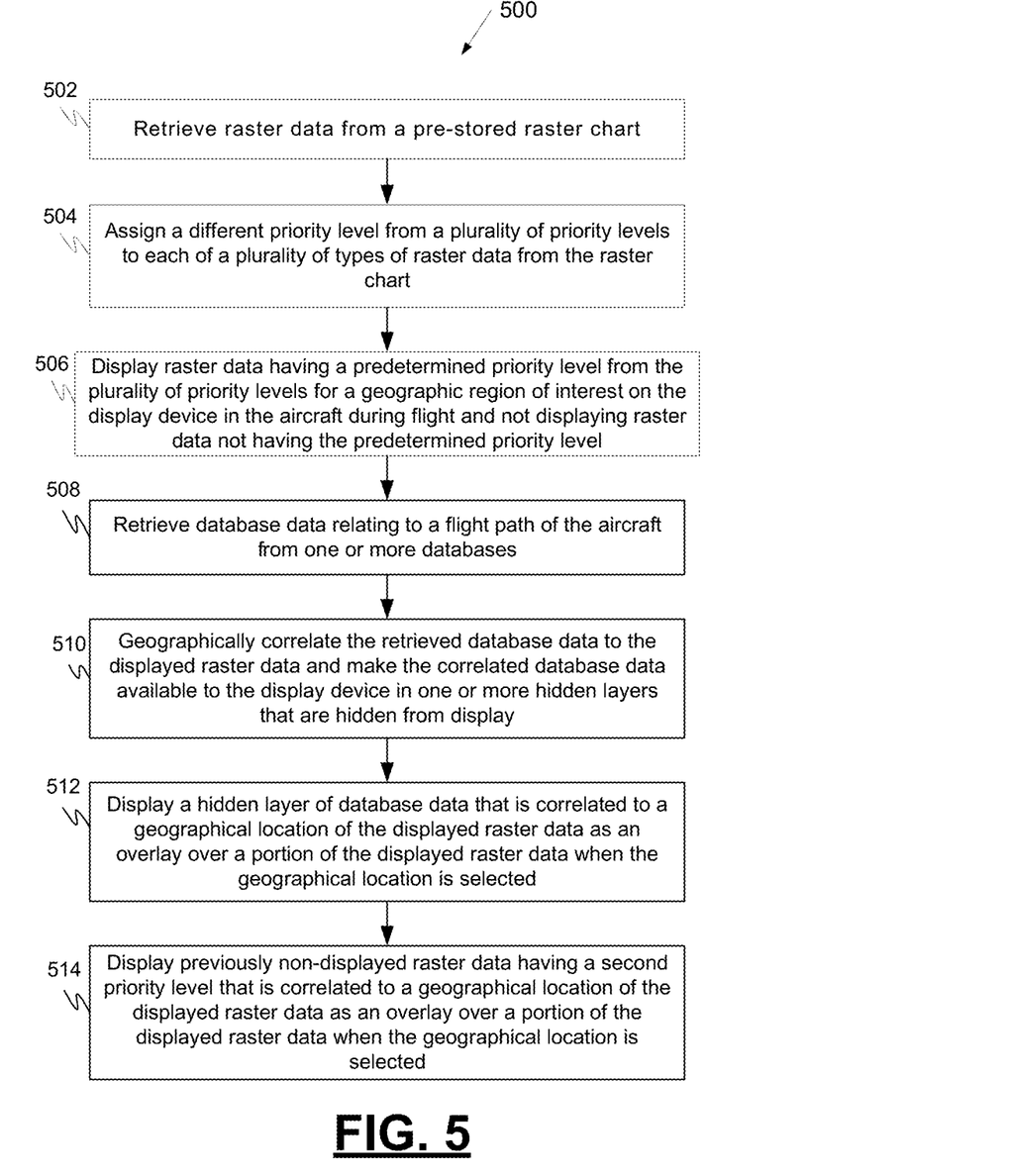
FIG. 5 is a process flow chart depicting an example process in an aircraft for selectively displaying information from raster charts on a cockpit display device, in accordance with some embodiments.

FIG. 5 is a process flow chart depicting an example process 500 in an aircraft for selectively displaying information from raster charts on a cockpit display device (e.g., a navigation display). The order of operation within the process 500 is not limited to the sequential execution as illustrated in the figure, but may be performed in one or more varying orders as applicable and in accordance with the present disclosure.

The example process 500 includes retrieving raster data from a pre-stored raster chart (operation 502). The raster data may comprise, for example, topography image data, aeronautical data, railroad data, visual reference points, city boundaries, and/or road data The example process 500 includes assigning a different priority level from a plurality of priority levels to each of a plurality of types of raster data from the raster chart (operation 504) and displaying raster data having a predetermined priority level from the plurality of priority levels for a geographic region of interest on the display device in the aircraft and not displaying raster data not having the predetermined priority level (operation 506).

The example process 500 includes retrieving database data relating to a flight path of the aircraft from one or more databases (operation 508). The database data may comprise, for example, one or more of terrain data from an EGPWS terrain database, airport data from an airports database, navigation aid data from a navigation aids database, and airspace data from an airspace database The example process 500 includes geographically correlating the retrieved database data to the displayed raster data and make the correlated database data available to the display device in one or more hidden layers that are hidden from display (operation 510).

The example process 500 includes displaying a hidden layer of database data that is correlated to a geographical location of the displayed raster data as an overlay over a portion of the displayed raster data when the geographical location is selected (operation 512). Selecting a geographical location of the displayed raster data may include, for example, touch action on a touchscreen or hovering a cursor over the geographical location on the display device, explicit selection (e.g., via a cursor click action), and/or automatically selecting a geographical location of the displayed raster data when the aircraft reaches a certain geographically area on its flight path. A geographical location of the displayed raster data may only be selectable when the aircraft reaches a certain geographically area on its flight path.

The example process 500 further includes displaying previously non-displayed raster data having a second priority level that is correlated to a geographical location of the displayed raster data as an overlay over a portion of the displayed raster data when the geographical location is selected (operation 514).

Described herein are apparatus, systems, techniques, and articles for providing a dynamically augmented raster data display on a cockpit display. The apparatus, systems, techniques, and articles provided herein can allow a raster data display priority to be dynamically adjusted, and/or localized areas on a raster map to be dynamically associated with geographically collocated Nav/culture/structural information.

In one embodiment, a flight deck system in an aircraft for selectively displaying information from raster charts on a display device is provided. The flight deck system comprises a controller configured to: retrieve raster data from a pre-stored raster chart; assign a different priority level from a plurality of priority levels to each of a plurality of types of raster data from the raster chart; cause raster data having a first predetermined raster data priority level from the plurality of priority levels to be displayed with first augmentation information for a geographic region of interest on the display device in the aircraft and prevent from being displayed raster data not having the first predetermined priority level, wherein the first augmentation information comprises database data retrieved from a database stored on the aircraft and assigned a first predetermined augmentation information priority level; generate a hidden layer of second augmentation information comprising database data retrieved from the database that is correlated to a geographical location of the displayed raster data and assigned a second predetermined augmentation information priority level; and cause the hidden layer of second augmentation information to be displayed as an overlay over a portion of the displayed raster data when the geographical location is selected.

These aspects and other embodiments may include one or more of the following features. The first augmentation information may comprise dynamically generated information related to a flight path or plan for the aircraft that is assigned the first predetermined augmentation information priority level and the controller may be configured to cause the dynamically generated information that is assigned the first predetermined augmentation information priority level to be displayed with the raster data having a first predetermined raster data priority level and the database data assigned the first predetermined augmentation information priority level. The second augmentation information may comprise dynamically generated information related to the flight path or plan that is assigned a second predetermined augmentation information priority level and the controller may be configured to cause the dynamically generated information assigned the second predetermined augmentation information priority level to be displayed as an overlay over the portion of the displayed raster data when the geographical location is selected. The dynamically generated information may comprise one or more of flight plan data, weather data, and traffic data. The controller may be further configured to cause previously non-displayed raster data having a second priority level that is correlated to a geographical location of the displayed raster data to be displayed as an overlay over a portion of the displayed raster data when the geographical location is selected. The raster data may comprise topography image data, aeronautical data, railroad data, visual reference points, city boundaries, and/or road data. The database data may comprise one or more of terrain data from an EGPWS terrain database, airport data from an airports database, navigation aid data from a navigation aids database, and airspace data from an airspace database. The geographical location of the displayed raster data may be selected via touch action or hovering a cursor over the geographical location on the display device. The geographical location of the displayed raster data may be automatically selected when the aircraft reaches a certain geographically area on its flight path. The geographical location of the displayed raster data may be selectable only when the aircraft reaches a certain geographically area on its flight path.

In another embodiment, a method in an aircraft for selectively displaying information from raster charts on a display device is provided. The method comprises: retrieving raster data from a pre-stored raster chart; assigning a different priority level from a plurality of priority levels to each of a plurality of types of raster data from the raster chart; displaying raster data having a first predetermined raster data priority level from the plurality of priority levels with first augmentation information for a geographic region of interest on the display device in the aircraft and not displaying raster data not having the first predetermined priority level, wherein the first augmentation information comprises database data retrieved from a database stored on the aircraft and assigned a first predetermined augmentation information priority level; generating a hidden layer of second augmentation information comprising database data retrieved from the database that is correlated to a geographical location of the displayed raster data and assigned a second predetermined augmentation information priority level; and displaying the hidden layer of second augmentation information as an overlay over a portion of the displayed raster data when the geographical location is selected.

These aspects and other embodiments may include one or more of the following features. The first augmentation information may comprise dynamically generated information related to a flight path or plan for the aircraft that is assigned the first predetermined augmentation information priority level and the method may further comprise displaying the dynamically generated information that is assigned the first predetermined augmentation information priority level with the raster data having a first predetermined raster data priority level and the database data assigned the first predetermined augmentation information priority level. The second augmentation information may comprise dynamically generated information related to the flight path or plan that is assigned a second predetermined augmentation information priority level and the method may further comprise displaying the dynamically generated information assigned the second predetermined augmentation information priority level as an overlay over the portion of the displayed raster data when the geographical location is selected. The dynamically generated information may comprise one or more of flight plan data, weather data, and traffic data. The method may further comprise displaying previously non-displayed raster data having a second priority level that is correlated to a geographical location of the displayed raster data as an overlay over a portion of the displayed raster data when the geographical location is selected. The raster data may comprise topography image data, aeronautical data, railroad data, visual reference points, city boundaries, and/or road data. The database data may comprise one or more of terrain data from an EGPWS terrain database, airport data from an airports database, navigation aid data from a navigation aids database, and airspace data from an airspace database. The geographical location of the displayed raster data may be selected via touch action or hovering a cursor over the geographical location on the display device. The geographical location of the displayed raster data may be automatically selected when the aircraft reaches a certain geographically area on its flight path. The geographical location of the displayed raster data may be selectable only when the aircraft reaches a certain geographically area on its flight path.

In another embodiment, non-transitory computer readable media encoded with programming instructions configurable to cause a processor in flight deck equipment in an aircraft to perform a method is provided. The method comprises: retrieving raster data from a pre-stored raster chart; assigning a different priority level from a plurality of priority levels to each of a plurality of types of raster data from the raster chart; displaying raster data having a predetermined priority level from the plurality of priority levels for a geographic region of interest on the display device in the aircraft and not displaying raster data not having the first predetermined priority level, wherein the first augmentation information comprises database data retrieved from a database stored on the aircraft and assigned a first predetermined augmentation information priority level; generating a hidden layer of second augmentation information comprising database data retrieved from the database that is correlated to a geographical location of the displayed raster data and assigned a second predetermined augmentation information priority level; and displaying the hidden layer of second augmentation information as an overlay over a portion of the displayed raster data when the geographical location is selected.

These aspects and other embodiments may include one or more of the following features. The first augmentation information may comprise dynamically generated information related to a flight path or plan for the aircraft that is assigned the first predetermined augmentation information priority level and the method may further comprise displaying the dynamically generated information that is assigned the first predetermined augmentation information priority level with the raster data having a first predetermined raster data priority level and the database data assigned the first predetermined augmentation information priority level. The second augmentation information may comprise dynamically generated information related to the flight path or plan that is assigned a second predetermined augmentation information priority level and the method may further comprise displaying the dynamically generated information assigned the second predetermined augmentation information priority level as an overlay over the portion of the displayed raster data when the geographical location is selected. The dynamically generated information may comprise one or more of flight plan data, weather data, and traffic data. The method may further comprise displaying previously non-displayed raster data having a second priority level that is correlated to a geographical location of the displayed raster data as an overlay over a portion of the displayed raster data when the geographical location is selected. The raster data may comprise topography image data, aeronautical data, railroad data, visual reference points, city boundaries, and/or road data. The database data may comprise one or more of terrain data from an EGPWS terrain database, airport data from an airports database, navigation aid data from a navigation aids database, and airspace data from an airspace database. The geographical location of the displayed raster data may be selected via touch action or hovering a cursor over the geographical location on the display device. The geographical location of the displayed raster data may be automatically selected when the aircraft reaches a certain geographically area on its flight path. The geographical location of the displayed raster data may be selectable only when the aircraft reaches a certain geographically area on its flight path.

In another embodiment, a flight deck system in an aircraft for selectively displaying information from raster charts on a display device is provided. The flight deck system comprises a controller configured to: retrieve raster data from a pre-stored raster chart, wherein the raster data includes one or more of topography image data, aeronautical data, railroad data, visual reference points, city boundaries, and road data; assign a different priority level to each of a plurality of types of raster data from the raster chart; display the augmented raster data for a geographic region of interest from the raster chart having a predetermined priority level on the display device in the aircraft and hide from display the raster data not having the predetermined priority level; retrieve database data relating to a flight path of the aircraft from one or more databases, wherein the database data includes one or more of terrain data from an EGPWS terrain database, airport data from an airports database, navigation aid data from an navigation aids database, and airspace data from an airspace database; geographically correlate the retrieved database data to the displayed raster data and make the correlated database data available to the display device in one or more hidden layers that are hidden from display; reveal, for display over the displayed raster data, a hidden layer containing database data that is geographically correlated to displayed raster data in a region of interest when the database data in the layer is correlated to a geographical location of the displayed raster data that has been selected, wherein the hidden layer containing database data correlated to the selected geographical location of the displayed raster data is caused to overlay the displayed raster data; and reveal, for display with the displayed raster data, previously non-displayed raster data having a second priority level when the previously non-displayed raster data having the second priority level is related to a geographical location of the displayed raster data that has been selected.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft comprising:
   a cockpit display device in an aircraft cockpit; and
   a flight deck system comprising a controller, wherein the controller is configured to:
   retrieve IFR and/or VFR (IFR/VFR) data comprising a plurality of topography information, air traffic services information, information regarding airports that have an instrument approach procedure or a minimum 3000 foot hard surface runway, airways/route data, cruising altitudes, fixes/ATC reporting points, limits of controlled airspace, military training routes, off route obstruction clearance altitudes (OROCA), radio aids to navigation, RNAV routes, military training routes (MTRs), special use airspace (SUA), military operations area (MOA), and airport data from a pre-stored raster chart;
   assign a different priority level from a plurality of priority levels to each of a plurality of types of the IFR/VFR data, wherein the topography information is assigned to a first priority level;
   retrieve geo-referenced data from one or more geo-referenced data sources comprising one or more of an EGPWS (enhanced ground proximity warning system) terrain database data, an airports database data, a navigation aids (NAVAID) database data, an airspace database data, flight plan data, weather data, and traffic data from one or more geo-referenced data sources;
   assign a different priority level from a plurality of priority levels to each of a plurality of types of the geo-referenced data, wherein the flight plan data is assigned to a second priority level and the weather data and traffic data are assigned to a third priority level;
   generate a graphical display comprising a plurality of display levels including a first display level and a second display level, wherein IFR/VFR data assigned to the first priority level and any geo-referenced data assigned to the first priority level are included in the first display level, and IFR/VFR data assigned to the second priority level and any geo-referenced data assigned to the second priority level are included in the second display level;

cause the first display level of the graphical display to be displayed on the cockpit display device during a mission while the second display level of the graphical display is hidden from display; and cause the second display level to be displayed as an overlay over the first display level during the mission when selected.

2. The aircraft of claim 1, wherein the first display level further comprises dynamically generated information related to a flight path or plan for the aircraft that is assigned to the first priority level.

3. The aircraft of claim 2, wherein the second display level further comprises dynamically generated information related to the flight path or plan that is assigned to the second priority level.

4. The aircraft of claim 2, wherein the dynamically generated information comprises one or more of flight plan data, weather data, and traffic data.

5. The aircraft of claim 1, wherein the geo-referenced data comprises geo-referenced data that are correlated to a geographical location and the geo-referenced data that are correlated to a geographical location are selected when the geographical location is selected.

6. The aircraft of claim 1, wherein the second display level is selected to be displayed as an overlay over the first display level during the mission via touch action or hovering a cursor over a geographical location on the cockpit display device.

7. The aircraft of claim 1, wherein the second display level is selected to be displayed as an overlay over the first display level during the mission when the aircraft reaches a certain geographically area on its flight path.

8. The aircraft of claim 1, wherein the second display level may only be selected for display as an overlay over the first display level during the mission when the aircraft reaches a certain geographically area on its flight path.

9. A method in an aircraft for selectively displaying information from raster charts on a display device, the method comprising:

providing a cockpit display device;

retrieving IFR and/or VFR (IFR/VFR) data comprising a plurality of topography information, air traffic services information, information regarding airports that have an instrument approach procedure or a minimum 3000 foot hard surface runway, airways/route data, cruising altitudes, fixes/ATC reporting points, limits of controlled airspace, military training routes, off route obstruction clearance altitudes (OROCA), radio aids to navigation, RNAV routes, military training routes (MTRs), special use airspace (SUA), military operations area (MOA), and airport data from a pre-stored raster chart;

assigning a different priority level from a plurality of priority levels to each of a plurality of types of the IFR/VFR data from the raster chart, wherein the topography information is assigned to a first priority level;

retrieving geo-referenced data from one or more geo-referenced data sources comprising one or more of an EGPWS (enhanced ground proximity warning system) terrain database data, an airports database data, a navigation aids (NAVAID) database data, an airspace database data, flight plan data, weather data, and traffic data from one or more geo-referenced data sources;

assigning a different priority level from a plurality of priority levels to each of a plurality of types of the geo-referenced data, wherein the flight plan data is assigned to a second priority level and the weather data and traffic data are assigned to a third priority level;

generating a graphical display comprising a plurality of display levels including a first display level and a second display level, wherein IFR/VFR data assigned to the first priority level and any geo-referenced data assigned to the first priority level are included in the first display level, and IFR/VFR data assigned to the second priority level and any geo-referenced data assigned to the second priority level are included in the second display level;

displaying the first display level of the graphical display on the cockpit display device during a mission while the second display level of the graphical display is hidden from display;

receiving selection of the second display level for display; and displaying the second display level as an overlay over the first display level during the mission when selected.

10. The method of claim 9, wherein the first display level further comprises dynamically generated information related to a flight path or plan for the aircraft that is assigned the first priority level.

11. The method of claim 10, wherein the second display level further comprises dynamically generated information related to the flight path or plan that is assigned the second.

12. The method of claim 10, wherein the dynamically generated information comprises one or more of flight plan data, weather data, and traffic data.

13. The method of claim 10, wherein the geo-referenced data comprises geo-referenced data that are correlated to a geographical location and the geo-referenced data that are correlated to a geographical location are selected when the geographical location is selected.

14. The method of claim 9, wherein receiving selection of the second display level for display comprises receiving selection via touch action or hovering a cursor over a geographical location on the cockpit display device.

15. The method of claim 9, wherein receiving selection of the second display level for display comprises automatically receiving selection when the aircraft reaches a certain geographically area on its flight path.

16. The method of claim 9, wherein receiving selection of the second display level for display comprises receiving selection via touch action or hovering a cursor over a geographical location on the cockpit display device only when the aircraft reaches a certain geographically area on its flight path.

17. Non-transitory computer readable media encoded with programming instructions configurable to cause a processor in flight deck equipment in an aircraft to perform a method, the method comprising:

retrieving IFR and/or VFR (IFR/VFR) data comprising a plurality of topography information, air traffic services information, information regarding airports that have an instrument approach procedure or a minimum 3000 foot hard surface runway, airways/route data, cruising altitudes, fixes/ATC reporting points, limits of controlled airspace, military training routes, off route obstruction clearance altitudes (OROCA), radio aids to navigation, RNAV routes, military training routes (MTRs), special use airspace (SUA), military operations area (MOA), and airport data from a pre-stored raster chart, wherein the topography information is assigned to a first priority level;

assigning a different priority level from a plurality of priority levels to each of a plurality of types of the IFR/VFR data from the raster chart;

retrieving geo-referenced data from one or more geo-referenced data sources comprising one or more of an EGPWS (enhanced ground proximity warning system) terrain database data, an airports database data, a navigation aids (NAVAID) database data, an airspace database data, flight plan data, weather data, and traffic data from one or more geo-referenced data sources;

assigning a different priority level from a plurality of priority levels to each of a plurality of types of the geo-referenced data, wherein the flight plan data is assigned to a second priority level and the weather data and traffic data are assigned to a third priority level;

generating a graphical display comprising a plurality of display levels including a first display level and a second display level, wherein IFR/VFR data assigned to the first priority level and any geo-referenced data assigned to the first priority level are included in the first display level, and IFR/VFR data assigned to the second priority level and any geo-referenced data assigned to the second priority level are included in the second display level;

displaying the first display level of the graphical display on a cockpit display device during a mission while the second display level of the graphical display is hidden from display;

receiving selection of the second display level for display; and displaying the second display level as an overlay over the first display level during the mission when selected.

18. The non-transitory computer readable media of claim 17, wherein receiving selection of the second display level for display comprises receiving selection via touch action or hovering a cursor over a geographical location on the cockpit display device.

19. The non-transitory computer readable media of claim 18, wherein receiving selection of the second display level for display comprises automatically receiving selection when the aircraft reaches a certain geographically area on its flight path.

20. The non-transitory computer readable media of claim 17, wherein receiving selection of the second display level for display comprises receiving selection via touch action or hovering a cursor over a geographical location on the cockpit display device only when the aircraft reaches a certain geographically area on its flight path.

* * * * *